April 25, 1961

F. L. LANE ET AL 2,981,097

LOAD APPLICATION UNIT

Filed Oct. 18, 1957

INVENTORS.
Frank L. Lane
Harold D. Roberts

BY H.C. Goldwire

AGENT

United States Patent Office 2,981,097
Patented Apr. 25, 1961

2,981,097

LOAD APPLICATION UNIT

Frank L. Lane and Harold D. Roberts, Dallas, Tex., assignors to Chance Vought Corporation, a corporation of Delaware Filed Oct. 18, 1957, Ser. No. 690,939

1 Claim. (Cl. 73—88)

This invention relates to a load application unit and more particularly to a unit adapted to apply pulling loads to a surface of a body for structural testing thereof.

In the structural testing of a major part or assembly of an aircraft, for example a wing, fuselage section, or empennage unit, it is frequently desirable to load the outer surface of the part or assembly (hereinafter termed a "body") with an evenly distributed load or loads tending to pull it in its entirety in a particular direction which is such that the surface to which the load is applied is urged away from the inner structure of the body. As one example of its usefulness, such a loading may be employed in simulating negative air pressures which will be encountered under certain conditions by the body or its counterpart when it is in flight as part of an aircraft. Such testing of the body may be accomplished before or after it is assembled into or on the completed aircraft and the results obtained are indicative of the ability of the body to withstand the anticipated flight loads or, as the case may be, of the necessity of reinforcing the body or otherwise changing its design to the end of endowing it with the requisite structural strengths.

To secure valid results, it is desirable to load the entire surface evenly in conformity with predicted air loadings. Consequently, the means employed for connecting the pulling load to the body should effect an even application of the load in a suitable pattern over all (or, in practice, at least over a considerable portion) of a designated surface of the body, and it should not tend to concentrate the pulling forces at points or in very small local areas since this would not realistically simulate the anticipated air loading.

Plates made of metal or other relatively rigid materials shaped to conform to the surface of the tested body, attached thereto by adhesives, and provided with fittings for receiving pulling loads have been proposed as the means of loading the surface of the body with adequate uniformity, but these are slow and expensive to fashion. The drilling of holes in the surface or the use of spot-welding, etc. for the attachment of load-imposing members to it also have been proposed, but these are unsatisfactory since they result in a loading of the surface in small local areas. Furthermore, all the above expedients have a defect which inevitably invalidates any test results arrived at through their use, and this defect lies in the physical changes wrought thereby, in each case, in the body tested. Material is removed when holes are drilled, and parts spot-welded or adhesively bonded to the body become in effect integral therewith and the structural characteristics of the body accordingly are changed. Efforts which may be made to correct the data obtained in compensation for such structural changes are highly subject to error of a magnitude which, especially in the testing of a component of an airframe, cannot be tolerated.

It has previously been proposed that a substantially rigid plate to which a pulling load may be applied be employed with a pad of solid or sponge rubber or similar material bonded directly (or through one or more intermediate layers or pads) to the body to be tested on one of the sides of the pad and to the plate on the other. Among other advantages sought to be obtained by this arrangement is that of providing a fixture which, by virtue of the conformability of the pad, adapts itself to the contours of a surface to which it is applied and hence permits the use of a fixture employing a plate only generally corresponding to a curved or irregular contour of the surface and allowing the use of even an entirely flat plate on such surfaces. In addition, it was contemplated that a pulling load applied at a point on the plate would be evenly distributed throughout the area of the pad and hence evenly applied to the surface of the body tested. Disadvantages and complexities have been encountered when such arrangements have been employed, however, and these have included the difficulties involved in discovering and obtaining suitable rubber or similar compounds for the pads and the provision of suitable adhesives for their attachment. The pad materials have been inclined to show slow cohesive failure; hence, their yieldability, while necessary for an even distribution of the load on the body tested, is a great disadvantage when the load must be maintained on the body for a considerable time; and continued, gradual yielding takes place which eventually results in structural failure of the pad. To offset this disadvantage, attempts have been made to use special rubber compounds, but these frequently require adhesives which, when found, often turn out to be incompatible with the surface of the body or of the fixture's plate, or they may offer other disadvantages. For example, environmental conditions have been a frequent source of failure of the fixture: the rubber or the adhesive frequently is not able to withstand operation at the temperatures imposed under the test environment; and liquids or vapors, such as, for example, liquid fuels and their fumes, frequently injure and precipitate failure of the pad and/or adhesive. The strength of the pad is apt to be marginal under many desired conditions of loading.

Accordingly, it is a principal object of the invention to provide a means for protecting parts of a fixture for imposing pulling loads on a surface from the deleterious effects of fluids present in the operational environment of the fixture.

Another object is to provide a fixture attachable to a surface for imposing a pulling load on a relatively large area thereof rather than at discrete points or in a small area.

A further object is to provide a fixture for imposing pulling loads on a surface which is not subject to cohesive failure and which employs a pad which is not susceptible to the deleterious effects of fluids harmful to many rubbers and similar compounds.

Yet another object is to provide a fixture for imposing pulling loads which is bondable and readily conformable to a variety of curved or irregular surfaces.

A still further object is to provide a fixture employing a pad which retains substantially all its yieldability and elasticity at low temperatures.

Still another object is to provide a fixture attachable to a surface for imposing pulling loads thereon which is inexpensive and simple to make and use.

An additional object is to provide a fixture attachable to a surface for imposing pulling loads thereon which employs a pad that is firmly gripped by commonly used adhesives.

Other objects and advantages will be apparent from the specification and claim and from the accompanying drawing which illustrates an embodiment of the invention.

Briefly described, the invention comprises means for protecting a part or bonding agent of a fixture, bonded to a surface on which the fixture imposes for test purposes a pulling load, from the deleterious effects of fluids in the environment in which the fixture is used. The invention further comprises a means for connecting a pulling load to a surface of a body for structural testing thereof including an intermediate body or pad bonded to the surface of the tested body and to a substantially rigid plate adapted for the attachment of a pulling load. The pad is made of felted fibers and is stitched through in a plurality of places by mechanical fastening means of relatively high strength which, for example, may include staples or a thread or other filament. The means for protecting a part or parts of the fixture from fluids may be any flexible, adherent material applied around some or all, as required, of the periphery of the pad in sealing relation between the plate and the surface of the body to be tested.

Figure 1:
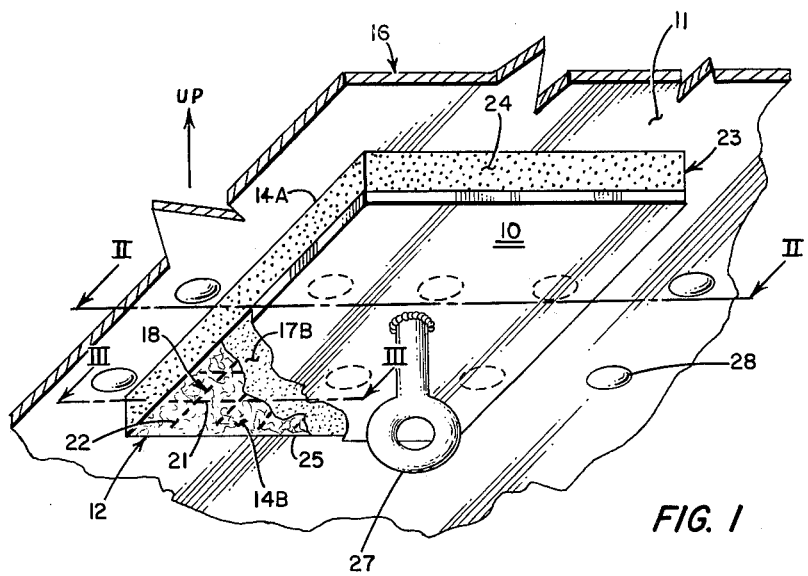
Figure 1 is an isometric view of the fixture made according to the invention and installed on the under surface of a body to which a pulling load is to be applied.

With reference now to the drawing and particularly to Figure 1, a body 16 to which, for structural testing thereof, a pulling load is to be applied, has a surface 11 which, though shown as generally flat, has irregularities of contour such as those provided by the heads of rivets 28 and which is not necessarily flat but may be curved or somewhat irregular in contour. A fixture 23 for applying pulling forces to the surface 11 is attached thereto by means to be described and comprises a substantially rigid plate 10 provided with a ringbolt 27 or other fitting to which a load-imposing member may be attached, the ringbolt constituting the attaching means referred to hereinafter. The plate 10 is disposed adjacent to and spaced from the surface 11 and in generally parallel or concentric relationship thereto, and it may be made of metal or any other material of suitable properties including adequate rigidity.

Disposed between the plate 10 and surface 11 is an intermediate body or pad 12 whose outline generally matches that of the plate 10 and which is made of matted fibers 13 such as wool or any other natural or synthetic material felted or interlocked in a manner wherein the pad formed thereby has a good degree of yieldability to pressure and tension and yet has a considerable degree of physical strength. The pad has opposite, load-bearing faces 14A, 14B, one of which lies against and generally matches in area the adjoining face 15 of the plate 10 and the other of which lies against the surface 11 of the body 16 to be tested.

Figure 2:
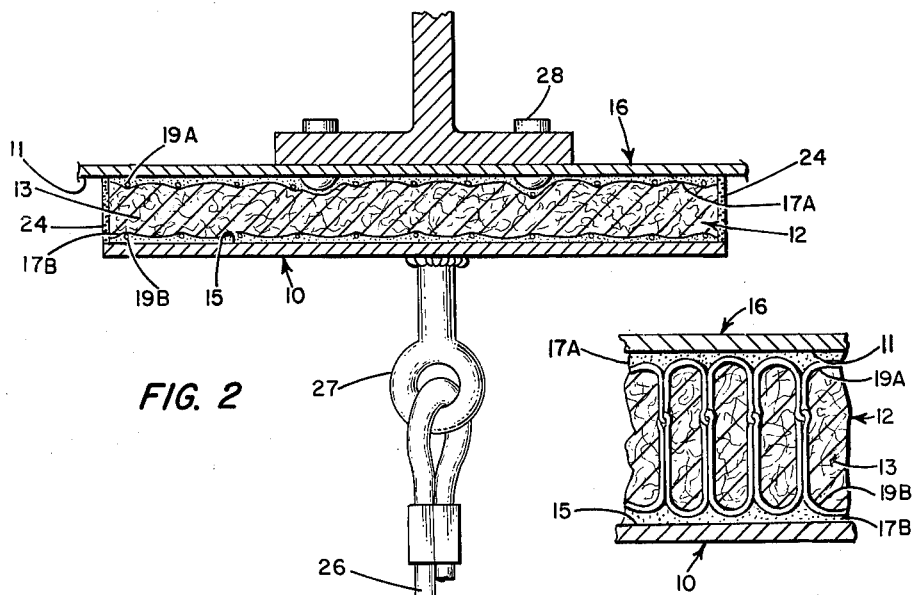
Figure 2 is an enlarged cross-sectional view taken as along line II—II of Figure 1 and showing a wire or cable attached to the plate for imposing a pulling load thereon.

The pad 12 is attached to the plate 10 and surface 11 by adhesive means which, as shown in exaggerated thickness for clarity of representation in Fig. 2, covers both load-bearing faces 14A, 14B of the pad 12 and bonds them respectively to the plate 10 and surface 11. For best attachment of the pad 12, the adhesive layers 17A, 17B of course should cover substantially all the respective areas of the load-bearing faces 14A, 14B. Where feasible, one adhesive material may be employed to form both layers 17A, 17B, but in case the material of the plate 10 should not be compatible with the adhesive best employed for the attachment of the pad 12 to the surface 11, one adhesive may be employed in the layer 17A and still another adhesive, more effective for bonding the pad 12 to the plate 10, may be employed in the other layer 17B. Since there are presently available a number of suitable adhesives for bonding felt or felt-like, matted materials having interlocking fibers to panels made of metal, glass or glass fiber, plastics, wood, etc., and since these adhesives are well known through advertising and other media to those versed in the art to which the present invention pertains, the properties of the adhesive means will be discussed only generally herein. It will be understood, however, that the adhesive employed must adhere well to the surface 11 or 15 to which it bonds the pad surface 14A or 14B and that its physical properties must be such that it will readily coat or surround the fibers of the pad 12 at and slightly beneath the pad surface 14A or 14B. As explained later, it is not entirely necessary that the adhesive adhere directly to the fibers, it being necessary only that it will enter intimately among and adhere to itself around them. Where the pad is made of wool fibers, a preferred adhesive is a low-pressure laminating resin of polyester or other suitable type of adhesive such as defined under Type I in U.S. Military Specification MIL-R-7575A of April 27, 1953. An example of an adhesive under the above specification is one employing a polyester base with unsaturated alkyd-styrene cross linking agents. Another material useful for forming the adhesive layers 17A, 17B is a fuel-resistant rubber adhesive such as defined under Type III of U.S. Military Specification MIL-A-5092A (Aer) of August 27, 1952, and this same material also may be employed to form the coating 24 of the protective means described in a later paragraph.

Figure 3A:
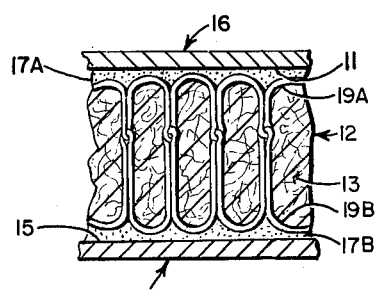
Figure 3a is an enlarged partial view taken in cross-section as along the line III—III of Figure 1 and showing one form of the mechanical fastening means.
Figure 3B:
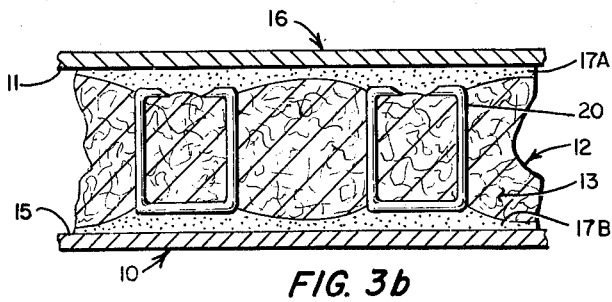
Figure 3b is a view similar to Figure 3a and showing a form of the invention wherein the mechanical fastening means comprises staples.

The mechanical fastening means includes one or more tie elements 18 (Figure 1) stitched through the pad 12 in a plurality of places evenly distributed over and connecting the two load-bearing surfaces 14A, 14B. The tie elements 18 should pierce the pad 12 at a plurality of places which preferably are at least fairly evenly distributed over the load-bearing faces 14A, 14B. Each tie element 18 may comprise a filament or thread passed through the pad 12 to form rows of stitches, or, as shown in Figure 3a, pairs of threads 19A, 19B may be interlocked to form rows of lock stitches. In a modification of the invention, the tie elements 18 may be staples 20 made of metal, plastic, etc. applied in rows and tying surface 14A to surface 14B. Whatever mechanical fastening means is employed, it should have considerable strength and should be well looped or turned over the surfaces 14A, 14B in order to give it a good grip on the surfaces. In the case of either threads or staples used as a mechanical fastening means, the stitches should not be so tight as to preclude at least a minimum of stretching of the pad 12 in a manner effecting a degree of separation of its two load-bearing faces 14A, 14B. The stitches may be arranged in any desired pattern effecting their relatively even distribution throughout the pad 12 (i.e., throughout its load-bearing faces 14A, 14B), and in the preferred embodiment shown in Figure 1, the stitches are applied in one set 21 of parallel rows running perpendicular to another set 22 of parallel rows. A number of filament materials are suitable for use in forming the mechanical fastening means. In general, the filament material chosen should be of comparatively low stretchability and high tensile strength, for example a filament made of glass fibers or, although it is generally more stretchable, of nylon thread of the low-stretch type defined in the U.S. Military Specification MIL-T-7807A of April 27, 1955.

The means for protecting parts of the fixture 23 from the deleterious effects of fluids found in its operational environment comprises a coating 24 applied, as shown in Figures 1 and 2, to the peripheral surface 25 of the pad, that is, its edge faces which extend between the plate 10 and the surface 11 of the body 16. While it is preferred in many cases that the protective coating 24 be applied around the entire perimeter of the pad 12, this is not always mandatory, but at a minimum the coating 24 must extend around at least as much of the perimeter of the pad 12 as may be subject to appreciable contact with the damaging fluid, i.e., with enough of the fluid to cause significant damage to components of the pad. The protective coating 24 should make a good, sealing contact with and form a continuous layer extending between the plate 10 and surface 11 throughout the perimeter of the pad 12 or the portion thereof to which it is applied. A preferred material which may be utilized in making the coating 24 is the flexible, fuel-resistant rubber adhesive already described; another is a flexible sealing compound such as defined in U.S. Military Specification MIL–S–7502B (ASG) of August 30, 1956.

It will be understood that, in practice, as many of the fixtures 23 may be attached to the surface 11 of the body 16 as are required to load all or a suitable percentage of the surface in accordance with predicted air loadings. In operation, a strong bond is easily effected between the pad 12 and the plate 10 and surface 11 since the adhesive or adhesives employed are forced into surrounding relationship with the pad fibers 13 at and near the pad surfaces 14A, 14B. Thus, interlocked with itself around the fibers 13, each adhesive layer 17A or 17B makes a superior bond with the pad 12 even if its adherence to the material of which the fibers 13 are composed is not especially good. A considerable leeway in the choice of adhesives is thus possible. When tension is applied on the plate 10 by a load-imposing member 26 connected, as shown in Figure 2, to the ringbolt 27, the forces imposed on the plate 10 are applied over all the surface of the latter to the adjoining load-bearing face 14B of the pad 12. As this load is in a direction tending to increase the spacing of the plate 10 from the surface 11 of the body 16, the plate 10 moves outwardly and the attached face 14B of the pad 12 moves with it. Consequently, the material of the pad 12 is deformed in a manner tending to further separate its two load-bearing faces 14A, 14B. During this deformation, the pulling forces become well distributed throughout the pad 12 and are applied evenly by the load-bearing face 14A thereof to the surface 11 of the body 16 to which it is attached.

Subjected to a pulling load of a given and sufficient magnitude, however, a pad 12 not provided with the mechanical fastening means 18 would experience failure in that it would quickly be pulled apart. Under a smaller load, the initial motion of the load-bearing surface 14B away from the load-bearing surface 14A attributable to the imposition thereon of the pulling load would be virtually stopped as a given degree of tension developed in the pad 12, but a slow and continuous spreading apart of the surfaces 14A, 14B would follow thereafter which, after sufficient time under the influence of a pulling force of sufficient magnitude, would result in cohesive failure of the pad and thus in its destruction by being pulled apart. Such failure is prevented, however, by the mechanical fastening means tie elements 18. As strong tension begins to develop in the pad 12, it is transferred from the two load-bearing surfaces 14A, 14B to the fastening means tie elements 18, and the relatively high tensile strength of the latter prevents separation of the two load-bearing surfaces 14A, 14B beyond the initial and desirable separation thereof which aids in distributing the pulling forces evenly throughout the pad 12 and through the latter to the surface 11 of the body 16. As a consequence, the material of the pad 12, while being yielding enough to conform well to the flat, curved, or irregular contour of the surface 11 for a good attachment thereto by the adhesive layers 17A, 17B and to adjust itself under loads so as to apply the pulling force evenly over the entire portion of the surface 11 rather than at a point or in a small area, still has excellent tensile strength and can transmit a heavy pulling load without the danger of immediate or slow cohesive failure.

Since the pad 12 is made of wool or of other properly chosen synthetic or natural fibers matted together in felt-like form, it is not inclined to stiffen at low temperatures or to lose its strength at high temperatures in the manner of a pad of rubber or similar material; instead, it retains substantially all its yieldability and elasticity at low temperatures and remains strong up to a comparatively high temperature. By proper choices of the fiber employed in the pad 12, the material employed for the mechanical fastening means 18, and of the one or more adhesives 17A, 17B employed, the pad 12 can readily be made in a form highly resistant to fluids which would cause quick failure of most rubber pads and/or their adhesives. For example, a pad 12 made of wool felt and stitched with threads 19A, 19B made of glass fiber or employing metal staples 20 as the mechanical fastening means is not at all damaged by liquid hydrocarbon fuels and their fumes, and such a combination readily permits in the adhesive layers 17A, 17B the use of a bonding agent such as a polysulfide/epoxy resin system which is similarly immune to damage by the fuel.

Since the parts and mode of construction of the presently disclosed fixture 23 are not costly and are easy to fashion, it is evident that the invention provides a load application unit, that is, a means for connecting a pulling load to a body, which is inexpensive and simple to make and use.

While only one embodiment of the invention has been described herein and shown in the accompanying drawing, it will be evident that various modifications are possible in the arrangement and construction of the load application unit components without departing from the scope of the invention.

We claim:

Means for connecting a pulling load to a body having a surface for structural testing of said body, said means comprising: a felted cloth pad having an opposed pair of load-bearing faces and a peripheral surface connecting said load-bearing faces; mechanical fastening means stitched through said pad between said load-bearing faces at a plurality of places distributed substantially evenly throughout said load-bearing faces of said pad; a plate having a face approximately equal in area to the area of at least one of said load-bearing faces; adhesive means for attaching approximately all the area of said one of said load-bearing faces to said plate and approximately all the area of the other of said load-bearing faces to said surface of said body; and attachment means provided on said plate for the connection to the latter of a load tending to move said plate and pad away from said body, said mechanical fastening means comprising staples affixed at intervals through said pad.

References Cited in the file of this patent

UNITED STATES PATENTS

| | | |
|---|---|---|
| Re. 14,349 | Burnett | Sept. 11, 1917 |
| 2,358,369 | Weaver et al. | Sept. 19, 1944 |
| 2,445,118 | Kintas | July 13, 1948 |
| 2,621,141 | Obitz | Dec. 9, 1952 |
| 2,647,399 | Newbill | Aug. 4, 1953 |